(12) United States Patent
Haydock

(10) Patent No.: US 7,704,470 B2
(45) Date of Patent: Apr. 27, 2010

(54) REMOVAL OF CONTAMINANTS FROM BY-PRODUCT ACIDS

(75) Inventor: Frederick Haydock, Murray, UT (US)

(73) Assignee: Haydock Consulting Services, LC, Murray, UT (US)

( * ) Notice: Subject to any disclaimer, the term of this patent is extended or adjusted under 35 U.S.C. 154(b) by 309 days.

(21) Appl. No.: 11/789,706

(22) Filed: Apr. 24, 2007

(65) Prior Publication Data

US 2008/0267856 A1    Oct. 30, 2008

(51) Int. Cl.
*C01G 23/00*    (2006.01)

(52) U.S. Cl. .............. 423/85; 423/81; 423/82; 423/339; 423/488; 423/495

(58) Field of Classification Search .............. 423/81, 423/82, 85, 339, 488, 495
See application file for complete search history.

(56) References Cited

U.S. PATENT DOCUMENTS

| | | | |
|---|---|---|---|
| 2,290,922 A | 7/1942 | Verduin | |
| 2,479,637 A | 8/1949 | Olson | |
| 3,016,286 A | 1/1962 | Masukawa et al. | |
| 3,104,950 A | 9/1963 | Ellis | |
| 3,471,252 A | 10/1969 | Sugahara et al. | |
| 3,528,773 A | 9/1970 | Suris et al. | |
| 3,582,275 A | 6/1971 | Sugahara et al. | |
| 3,702,773 A | 11/1972 | Han et al. | |
| 3,849,535 A * | 11/1974 | Irani ........................ | 423/140 |
| 4,110,492 A | 8/1978 | Hayman | |
| 4,269,809 A | 5/1981 | Tolley et al. | |
| 4,499,058 A | 2/1985 | Fitoussi et al. | |
| 4,770,796 A | 9/1988 | Jacobs | |
| 4,944,936 A | 7/1990 | Lawhorne | |
| 5,215,580 A | 6/1993 | Elfenthal et al. | |
| 5,395,532 A | 3/1995 | Chaiko | |
| 5,763,377 A | 6/1998 | Dobrez et al. | |
| 5,789,476 A * | 8/1998 | Iryo et al. ................ | 524/430 |
| 6,337,061 B1 | 1/2002 | Iyatomi et al. | |
| 6,375,923 B1 | 4/2002 | Duyvesteyn et al. | |
| 6,420,437 B1 * | 7/2002 | Mori et al. ................ | 516/90 |
| 6,440,377 B1 | 8/2002 | Auer et al. | |
| 6,440,383 B1 * | 8/2002 | Duyvesteyn et al. ........ | 423/611 |
| 6,444,189 B1 | 9/2002 | Wang et al. | |
| 6,500,396 B1 | 12/2002 | Lakshmanan et al. | |
| 6,548,039 B1 | 4/2003 | Duyvesteyn et al. | |
| 6,743,286 B2 | 6/2004 | Wen et al. | |
| 6,752,973 B2 | 6/2004 | Okusako | |
| 6,974,611 B2 | 12/2005 | Sakatani et al. | |
| 7,135,206 B2 | 11/2006 | Schichtel | |
| 7,179,857 B2 * | 2/2007 | Enjalbert et al. ............ | 524/430 |
| 2003/0170168 A1 | 9/2003 | Bonath et al. | |
| 2005/0142051 A1 | 6/2005 | Lakshmanan et al. | |
| 2006/0110318 A1 | 5/2006 | Torardi | |
| 2006/0257312 A1 | 11/2006 | Torardi | |

FOREIGN PATENT DOCUMENTS

JP    58015031 A  *  1/1983

OTHER PUBLICATIONS

J.J.M. Damen et al., Induction of Calcium Phosphate Precipitation by Titanium Dioxide, J Dent Res, Oct. 1991, 1346-1349, 70(10).
Kemira, Inc., Georgia Tech Research Institute Environmental Science and Technology Laboratory Pollution Prevention Project, 9 pages.

* cited by examiner

*Primary Examiner*—Melvin C Mayes
*Assistant Examiner*—Melissa Stalder
(74) *Attorney, Agent, or Firm*—Thorpe North & Western LLP

(57) ABSTRACT

The present invention is drawn to a method for removing colloidal titanium dioxide and titanium oxychloride from by-product hydrochloric acid. The method includes adding phosphate ion source and quaternary amine to the by-product acid to cause the titanium dioxide and the titanium oxychloride to form a precipitate. The precipitate can then be separated from the acid, thus producing a decontaminated hydrochloric acid product with reduced levels of titanium.

27 Claims, No Drawings

REMOVAL OF CONTAMINANTS FROM BY-PRODUCT ACIDS

BACKGROUND OF THE INVENTION

Certain processes for producing titanium dioxide generally rely on the use of chlorine, hydrochloric acid or sulfuric acid. As such, a waste stream of by-product hydrochloric acid or by-product sulfuric acid is produced. A by-product hydrochloric acid contains a variety of contaminants including colloidal silica, colloidal titanium dioxide, titanium oxychloride, and lesser amounts of other trace and heavy metal impurities. Currently, there is approximately 105,959,800 gallons (523,000 short tons) of by-product hydrochloric acid produced annually in the United States and Canada alone. Typically, this by-product acid is disposed of as waste due to the great amounts of contaminants preventing further use of the by-product acid.

An example process for manufacturing titanium dioxide consists of heating an ilmenite ore or a rutile titanium oxide containing sand ore, and coke to a controlled roasting temperature of approximately 1000° C. A stream or current of chlorine gas is passed into the heated carbon ore, at which point titanium tetrachloride, silicon tetrachloride, iron chloride, cadmium chloride and other trace inorganic chloride gases are formed. The lower volatile inorganic chloride gases with any of the other unreacted beginning materials are removed by condensation. The titanium tetrachloride and a very small fraction of some of the lower volatile compounds are oxidized with oxygen at 1400° C. to 1600° C. to form $SiO_2$ and crystals of rutile $TiO_2$ (the desired titanium dioxide) product of a required size. The titanium dioxide crystals are removed in the vapor phase, and the remaining vapors are quenched with water. The quenching produces by-product hydrochloric acid that contains contaminants of titanium dioxide, titanium oxychloride, silica and small amounts of acid soluble chlorides, e.g. iron chloride.

These contaminants generally prohibit the re-use of the hydrochloric acid in other processes. For example, the concentration levels of contaminants such as silica and titanium dioxide in the hydrochloric acid stream render the acid unusable for most steel pickling processes and chemical manufacturing processes. Instead, the acid streams are disposed as waste, stored indefinitely, and/or possibly subjected to a variety of reclamation processes that can be time-intensive and costly. Often, the waste streams are neutralized, such as with caustic soda or hydrated lime, to form a brine solution for disposal.

SUMMARY OF THE INVENTION

It has been recognized that it would be desirable to provide methods and systems to effectively treat by-product hydrochloric acid waste streams, particularly those containing colloidal silica, titanium dioxide, and titanium oxychloride, to a purity that provides some use for the decontaminated hydrochloric acid product in chemical processes, such as steel pickling. As such, the invention described herein outlines an economical and relatively fast method to produce an acceptable quality and quantity of decontaminated hydrochloric acid product from the by-product acid.

Rather than neutralizing and disposing of the by-product acid, the method herein uses a phosphate ion source and a quaternary amine to allow for separating colloidal titanium dioxide and titanium oxychloride from the by-product acid. Specifically, the method includes adding phosphate ion source and quaternary amine to the by-product acid to cause the titanium dioxide and the titanium oxychloride to precipitate. A decontaminated acid product can then be separated from the precipitate.

In another embodiment, a commercial grade hydrochloric acid, which has been decontaminated and recovered from by-product acid used to prepare titanium dioxide, can comprise decontaminated hydrochloric acid, and very low residual amounts of phosphate ion, quaternary amine, titanium dioxide, titanium oxychloride, and silica.

This process can remove a substantial amount of contaminant titanium and even, in some embodiments, silica while maintaining the concentration integrity of the starting by-product acid. Decontaminated acid produced through this method can be used in later chemical processes such as in steel pickling and for the manufacture of aluminum chloride water treatment chemicals.

The phosphate ion source can include a phosphoric acid; a metallic phosphate salt, such as calcium phosphate or sodium phosphate; and/or a phosphonate. In a specific embodiment, the phosphate ion source includes at least two different phosphate ion sources.

In conjunction with the phosphate ion source, the quaternary amine can cause and accelerate precipitation of colloidal titanium dioxide and titanium oxychloride. In one specific embodiment, the quaternary amine can include a polymeric quaternary amine and/or a quaternary polyamine.

In another embodiment, a commercial grade hydrochloric acid, which has been decontaminated and recovered from by-product acid used to prepare titanium dioxide, can comprise decontaminated hydrochloric acid, and residual amounts of phosphate ion, quaternary amine, titanium dioxide, titanium oxychloride, and silica.

Additional features and advantages of the invention will be apparent from the detailed description that follows, which illustrates, by way of example, features of the invention.

DETAILED DESCRIPTION OF THE PREFERRED EMBODIMENT(S)

Reference will now be made to the exemplary embodiments, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention. It is also to be understood that the terminology used herein is used for the purpose of describing particular embodiments only. The terms are not intended to be limiting unless specified as such.

It is noted that, as used in this specification and the appended claims, the singular forms "a," "an," and "the" include plural referents unless the content clearly dictates otherwise.

The term "contaminant" refers to undesirable chemical components in an acid that are typically introduced by the use of that acid in another chemical process. For example, the use of chlorine or hydrochloric acid in the preparation of titanium dioxide generates several contaminants. Contaminants specifically addressed by the method disclosed herein include colloidal titanium dioxide, titanium oxychloride, colloidal silica, and silicon oxychloride. Similarly, the term "decontaminated" in reference to an acid, indicates an acid wherein at least a portion of at least one contaminant has been removed. Thus, decontamination does not infer that all contaminates have been removed, but that the contaminants are removed to an extent that the recovered acid can be used in other commercial methods.

As used herein, "phosphoric acid" refers to a chemical including the phosphoric acid, usually substantially of the type orthophosphoric acid form. Orthophosphoric acid has the chemical formula $H_3PO_4$.

The term "polyamine" refers to compounds having at least one amine group. Thus, a polymeric amine would be considered a polyamine, as well as small molecules that have multiple amines.

The term "substantially free" refers to the total absence of or near total absence of a specific compound or composition. For example, when a composition is said to be substantially free of alkylated amines, there are either no alkylated amines in the composition or only residual amounts of alkylated amines in the composition. Likewise, the term "substantially" refers to the complete or nearly complete extent or degree of an action, characteristic, property, state, structure, item, or result. The exact allowable degree of deviation from absolute completeness may in some cases depend on the specific context. However, generally speaking the nearness of completion will be so as to have the same overall result as if absolute and total completion were obtained.

Concentrations, dimensions, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a volume concentration range of about 1 wt % to about 20 wt % should be interpreted to include not only the explicitly recited limits of 1 wt % and about 20 wt %, but also to include individual weights such as 2 wt %, 11 wt %, 14 wt %, and sub-ranges such as 10 wt % to 20 wt %, 5 wt % to 15 wt %, etc.

In accordance with this, it has been recognized that it would be beneficial to develop a way to remove contaminants, such as colloidal silica, colloidal titanium dioxide and titanium oxychloride from by-product hydrochloric acid. By removing the contaminants from the by-product acid, a product acid can be formed that can have utility in chemical processing, such as in steel pickling or the manufacture of aluminum chloride water treatment chemicals. As such, a method is presented for removing colloidal titanium dioxide and titanium oxychloride from by-product hydrochloric acid. The method includes adding phosphate ion source and quaternary amine to the by-product acid to cause the colloidal titanium dioxide and the titanium oxychloride to form a precipitate. The method can further include separating the precipitate from the liquid, thus producing a decontaminated acid product of hydrochloric acid. In a non-limiting example, such by-product acid can be by-products of titanium dioxide chemical processing.

In another embodiment, a commercial grade hydrochloric acid, which has been decontaminated and recovered from by-product acid used to prepare titanium dioxide, can comprise decontaminated hydrochloric acid and residual amounts of phosphate ion, quaternary amine, titanium dioxide, titanium oxychloride, and silica.

The chemistry to remove the titanium dioxide and the titanium oxychloride contaminants from the by-product acid can be relatively complex, as the titanium dioxide exists in a colloidal suspension. With colloidal suspensions, a factor in forming precipitates is related to the dimension or size of the colloids. The size of the colloidal titanium dioxide particles, as calculated by centrifuging and filtering samples, is smaller than about 0.2 μm. Thus, the surface area to volume ratio is very high. As such, the colloidal titanium dioxide particles do not readily settle out of solution under the forces of gravity, and remain as a colloidal suspension.

Another common contaminant in by-product acids is silica. Silica can exist in a colloidal state and, if allowed enough time, will settle out of solution and agglomerate at the bottom of a storage tank in a hard block, due at least in part to silica's affinity for hydroxyl ions. Colloidal titanium dioxide does not share the same affinity, and does not have a tendency to appreciably settle out of by-product acid, even if left for 12 months in storage. In tests related to the concentration of titanium in by-product hydrochloric acid left for long periods of storage, the overall concentration change of the titanium was less than 2%, thus indicating that the bulk of titanium remained in a colloidal suspension or as a soluble form of titanium oxychloride, with a minor amount attaching to the container walls. Where titanium oxychloride is soluble in the by-product acid, the presence of titanium oxychloride also hinders the removal of colloidal titanium dioxide.

As by-product hydrochloric acid contains both colloidal titanium dioxide and titanium oxychloride contaminants, it is useful to utilize a method that can successfully remove both contaminants from the by-product acid. To remove the contaminants, a phosphate ion source and a quaternary amine are added to destabilize the titanium oxychloride, thereby forming a titanium phosphate seed to initiate gelation of the colloidal titanium dioxide.

The phosphate ion source, such as phosphoric acid, sodium phosphate, calcium phosphate, phosphonates, and mixtures thereof, can react with titanium oxychloride as illustrated in the following Formulas. In one embodiment, the phosphate ion source can include a phosphoric acid. For example, the addition of phosphoric acid to titanium oxychloride is shown as Formula 1, and the addition of phosphoric acid to titanium dioxide is shown as Formula 2.

$$3TiOCl_2 + 4H_3PO_4 \rightarrow Ti_3(PO_4)_4 + 6HCl + 3H_2O \quad \text{Formula 1}$$

$$TiO_2 + H_3PO_4 \rightarrow H_3PO_4 \cdot TiO_2(gel) \quad \text{Formula 2}$$

The amount of phosphoric acid added to the by-product acid should be sufficient to stimulate and accelerate, along with the quaternary amine, the formation of precipitates of the titanium oxychloride and the colloidal titanium dioxide. In one embodiment, from about 12 g/gallon by-product acid to about 125 g/gallon by-product acid of phosphoric acid can be added. Such calculations are based on 1 gallon of by-product acid having a weight of approximately 9.1 lbs to 9.4 lbs. Such addition can vary depending on the amount of contaminant, the type of by-product acid, the desired recovery rate of decontaminated acid, the desired precipitation formation time before separation, etc. Additionally, the amount of phosphoric acid added can depend on the amount and type of quaternary amine added, as well as the amount and type of any other phosphate ion sources added. For example, in one aspect, phosphoric acid and quaternary amine can be added, without other phosphate ion sources. In such embodiment, the amount of phosphoric acid can range from about 25 g/gallon to about 125 g/gallon by-product acid. In a more specific embodiment, from about 50 g/gallon to about 75 g/gallon by-product acid of phosphoric acid can be added. In an alternate embodiment, phosphoric acid can be one of a plurality of phosphate ion sources added. For example, phosphoric acid and metallic phosphate salt can be added to cause the formation of a precipitate, along with quaternary amine. In such case, generally less phosphoric acid is used. In one aspect, from about 12 g/gallon to about 65 g/gallon by-product acid of phosphoric acid can be added. In a more specific aspect, from about 20 g/gallon to about 40 g/gallon by-product acid of phosphoric acid can be added.

In another embodiment, the phosphate ion source can comprise or consist essentially of a metallic phosphate salt. Such metallic phosphate salt can include one or a plurality of distinct metallic phosphate salts. Formulas 3 through 6 illustrate the addition of two metallic phosphate salts, sodium phosphate and calcium phosphate, to titanium oxychloride and to colloidal titanium dioxide. Specifically, Formula 3 shows the reaction between titanium oxychloride and sodium phosphate, Formula 4 shows the reaction between titanium oxychloride and calcium phosphate, Formula 5 illustrates the reaction between colloidal titanium dioxide and sodium phosphate, and finally Formula 6 shows the reaction between colloidal titanium dioxide and calcium phosphate.

$$3TiOCl_2 + 2Na_3PO_4 + 2H_3PO_4 \rightarrow Ti_3(PO_4)_4 + 6NaCl + 3H_2O \qquad \text{Formula 3}$$

$$3TiOCl_2 + Ca_3(PO_4)_2 + 2H_3PO_4 \rightarrow Ti_3(PO_4)_4 + 3CaCl_2 + 3H_2O \qquad \text{Formula 4}$$

$$TiO_2 + Na_3PO_4 \rightarrow Na_3PO_4 \cdot TiO_2(\text{gel}) \qquad \text{Formula 5}$$

$$TiO_2 + Ca_3(PO_4)_2 \rightarrow Ca_3(PO_4)_2 \cdot TiO_2(\text{gel}) \qquad \text{Formula 6}$$

The gel that is formed in Formulas 2 and 5-6 is typically a fluffy, voluminous precipitate composed of particles of titanium dioxide with surface area still slightly larger than volume. These particles can attach to receptor molecules and form gel that is stratified in bulky, suspended layers within the treated by-product acid. Eventually in some embodiments, the bulk of the precipitate can fall out of solution and agglomerate at the bottom of the settling container The category of metallic phosphate salt is not intended to be limited to sodium phosphates, such as trisodium phosphate, and calcium phosphates, such as tricalcium phosphate. Rather, such compounds were selected as illustrative of the reactions between metallic phosphate salts and colloidal titanium dioxide and titanium oxychloride. Metallic phosphate salts, therefore, can include any alkali metal, alkaline earth metal, and transition metal phosphate compounds.

As with the phosphoric acid, the amount of metallic phosphate salt added to the by-product acid should be sufficient to stimulate and accelerate, along with the quaternary amine, the formation of precipitates of the titanium oxychloride and the colloidal titanium dioxide. In one embodiment, from about 45 g/gallon to about 400 g/gallon by-product acid of metallic phosphate salt can be added. Such addition can vary depending on the type of metallic phosphate salt and the respective molecular weight used, the amount of contaminant, the type of by-product acid, the desired recovery rate of decontaminated acid, the desired precipitation formation time before separation, etc. Again as with the phosphoric acid, the amount of metallic phosphate salt added can depend on the amount and type of quaternary amine added, as well as the amount and type of any other phosphate ion sources added, including the variety of metallic phosphate salts used. In one embodiment, metallic phosphate salt and quaternary amine can be added, without other phosphate ion sources. In such embodiment, the amount of metallic phosphate salt can range from about 90 g/gallon to about 400 g/gallon by-product acid. In a more specific embodiment, from about 150 g/gallon to about 250 g/gallon by-product acid of metallic phosphate salt can be added.

In an alternate embodiment, metallic phosphate salt can be one of a plurality of phosphate ion sources added. For example, phosphoric acid and metallic phosphate salt can be added to cause the formation of a precipitate, along with a quaternary amine. In such case, generally less metallic phosphate salt is used, as it is not the sole source of phosphate ions. In one aspect, from about 45 g/gallon to about 200 g/gallon by-product acid of metallic phosphate salt can be added. In a more specific aspect, from about 75 g/gallon to about 125 g/gallon by-product acid of metallic phosphate salt can be added.

As briefly discussed, the phosphate ion source can comprise a single distinct chemical or can be a plurality of phosphate ion sources. In one embodiment, phosphate ion sources can comprise or consist essentially of any of phosphoric acids, metallic phosphate salts, and phosphonates. In one aspect, the phosphate ion source can include at least two different phosphate ion sources. For example, the phosphate ion source can include phosphoric acid and metallic phosphate salt. Further, the metallic phosphate salt can include a plurality of distinct metallic phosphate salts. A non-limiting example of this case would be the use of calcium phosphate and sodium phosphate together. In a specific embodiment, the phosphate ion source can be substantially free of alkylated phosphates. Additionally, the phosphate ion source can be low-carbon phosphates, i.e. C1-C6 phosphates.

Adding a quaternary amine to the by-product acid along with the phosphate ion source can increase the rate of precipitate formation. In one embodiment, the quaternary amine can be a polymeric quaternary amine. Such quaternary amines can be charged. For example, the polymeric quaternary amine can be cationic or anionic. Non-limiting examples of quaternary polyamines that can be used include polymeric quaternary amines, such as, but not limited to, liquid cationic polymeric coagulants by Cytec, such as Cytec C-572, C-573, C-577, and C-581. General Electric also produces polymeric quaternary amines, such as PC 1195, that can be used in the present application. In a specific embodiment, the quaternary amine can be substantially free of alkylated amines.

The amount of quaternary amine used is typically less than the total amount of phosphate ion source. In one embodiment, about 5.0 g/gallon to about 50.0 g/gallon by-product acid of quaternary amine can be used. In a more specific embodiment, from about 10.0 g/gallon to about 20.0 g/gallon by-product acid of quaternary amine can be used. Still in a further embodiment, from about 12.0 g/gallon to about 15.0 g/gallon by-product acid of quaternary amine can be used. While the by-product acid can include a variety of contaminants in varying concentrations, and can further have varying acid concentrations as a result of the process that produces the by-product acid, in one aspect, the acid concentration can range from about 18% to about 30%. Under many processing conditions, the by-product acid can weigh from about 9.1 lbs to about 9.4 lbs. In one aspect of the present application, the respective amounts of additives such as phosphate ion source and quaternary amine can be adjusted according to the noted by-product acid weight in relation to the treated by-product acid.

By-product acid streams of the type described herein often contain silicon-based contaminant, such as silica, often in a colloidal form, and silicon oxychloride. The presence of such contaminants can reduce the usefulness or effectiveness of decontaminated acid produced through the methods disclosed herein. Fortunately, silica and silicon oxychloride can be removed in a manner presented herein for the removal of titanium dioxide and titanium oxychloride. As such, silica and silicon oxychloride can be removed from by-product acids through the presently disclosed methods, i.e. adding phosphate ion source and quaternary amine to the by-product acid and separating the precipitate from the decontaminated acid product. Further, the silica precipitate is more manageable than the precipitate of other systems. As mentioned, if the silica is not removed, it forms a hard block of material at the bottom of a settling tank. This hard block would otherwise require intense mechanical and/or extensive chemical treatment to remove the material from the tank. Such treatment is time-intensive, and can, in some instances, be harmful to the process equipment. By precipitating silica and silicon oxychloride from the hydrochloric acid with the addition of a phosphate ion source and a quaternary amine, the precipitated silicon-based contaminants produce a precipitate that is easily handled and does not form a hard block of material.

The addition of the phosphate ion source and the quaternary amine can be in any order that effectuates the formation of a precipitate of titanium contaminants in the by-product acid. As such, the phosphate ion source can be added before the quaternary amine. Alternatively, the quaternary amine can be added before the phosphate ion source. There can be a time-lag of minutes to hours between additions, although it is currently preferred to add the phosphate ion source and the quaternary amine with relatively little time lag. Additionally, the phosphate ion source and the quaternary amine can be added to the by-product acid simultaneously. Such addition can include adding the phosphate ion source and the quaternary amine at the same time to the by-product acid, or can include pre-mixing the phosphate ion source and the quaternary amine together and then adding the mixture to the by-product acid.

In one aspect, the phosphate ion source and the quaternary amine can be mixed in with the by-product acid. Such mixing can be by low-shear to no-shear mixing. The amount of time is dependent on the particular by-product acid, phosphate ion source, quaternary amine, and amounts of each, as well as desired decontaminated acid characteristics. As a non-limiting example, the phosphate ion source and the quaternary amine can be mixed with the by-product acid for a time from about 30 minutes to about 5 hours. In a further example, the mixing time can be from about 1 hour to about 3 hours.

The phosphate ion source and the quaternary amine can benefit from a period of time to form a precipitate of the colloidal titanium dioxide and titanium oxychloride. Such settling times can range from hours to days. However, with the action of both the phosphate ion source and the quaternary amine, settling times are accelerated compared to other precipitation processes. In one embodiment, the step of separating the decontaminated acid product from the precipitate can occur in less than about 50 hours after adding phosphate ion source and quaternary amine to the by-product acid. In another embodiment, the step of separating can occur in less than about 30 hours after adding phosphate ion source and quaternary amine to the by-product acid. Under some circumstances, the step of separating can occur less than about 20 hours after adding phosphate ion source and quaternary amine to the by-product acid.

Typically, lower amounts of the metallic phosphate salt and phosphoric acid can increase the time to achieve the same volume of acid recovery by several days of settling time. The higher amounts of phosphoric acid and metallic phosphate salt do not, however, typically improve the volume of acid in a shorter period of time and, in fact actually slow the process down, even with the addition of the quaternary amine. Thus, an optimized level of phosphate ion source can be experimentally obtained for each by-product acid. The combination of phosphate ion source and quaternary amine functions to initiate and accelerate the precipitation of contaminants from by-product acid.

The step of separating the decontaminated acid product from the precipitate can be completed by any presently known method of separation, including decanting, centrifuging, filtering, sedimentation, or combinations thereof. In a specific embodiment, the step of separating can include filtering.

The methods described herein can optionally include use of heat. Such use is not required, however, and all portions of the method, either separately, or as a whole, can be performed at or below room temperature. Therefore, in one embodiment, the method, including adding phosphate ion source and quaternary amine to a by-product acid and separating an acid product, can be performed at or below room temperature. In another embodiment, the step of adding phosphate ion source and quaternary amine to a by-product acid can be performed at room temperature. In still another embodiment, the separate optional steps of mixing and allowing settling time can be performed at room temperature individually or collectively. In another embodiment, the method can be performed at temperatures less than about 20 degrees below the boiling point of the components, i.e. acid, phosphate ion source, and quaternary amine.

The removal of colloidal titanium dioxide and titanium oxychloride can be performed in batch, semi-batch, or continuous process conditions. Currently preferred embodiments utilize a batch process, and as such, much discussion is geared towards batch-type processing, however, it should be noted that various process conditions and equipment can be utilized to complete the methods described herein under a variety of processing conditions, and should not be limited to batch conditions.

Therefore, according to one embodiment of the current presented method, a by-product hydrochloric acid containing contaminants of the form of colloidal titanium dioxide, titanium oxychloride, optionally colloidal silica, silicon oxychloride, and metallic chlorides or other contaminants, can be circulated in a reaction vessel and/or settling tank. Phosphate ion source and quaternary amine can be added to the by-product acid to destabilize the colloidal suspensions by gelation/agglomeration. The phosphate ion source and quaternary amine can be blended and mixed in the reaction vessel tank for about 1 to about 3 hours by slow, non-shearing mechanical agitation. Colloidal titanium dioxide, titanium oxychloride, and optionally colloidal silica and silicon oxychloride can form a destabilizing gel that acts as a charged receptor molecule to attach sufficient particles to begin precipitation. After the mechanical agitation is terminated, the mixture can be allowed to sit in the reaction vessel for about 12 to about 16 hours where the precipitate can settle to the bottom of the vessel. Alternatively, the mixture can be pumped to another vessel, separate from the mixing vessel, for settling. The settling vessel can have, e.g., a coned, dished, or flat bottom. The decontaminated hydrochloric acid can remain in the upper portion of the vessel and can be pumped to a different storage tank. Additionally, the decontaminated acid can be pumped through a filter, such as a micron bag filter of at least about 5 microns to remove any suspended precipitate particles. The remaining precipitate can be removed from the vessel and properly disposed. Such disposal may include filter-pressing the precipitate and neutralizing it with a caustic solution, followed by disposal in landfill.

Use of the methods described herein can provide excellent results judged as effectively removing contaminants from by-product acid, producing a quality of decontaminated acid that can be used in other chemical processes, and at a relatively high recovery rate. In one embodiment, the titanium concentration in the by-product acid can be reduced by greater than about 95% in the resulting decontaminated acid product. In a further embodiment, the titanium concentration can be reduced by greater than about 98%. And in still a further embodiment, the titanium concentration can be reduced by greater than about 99%. Such titanium concentration reductions can result in a decontaminated acid product having a titanium concentration of less than 50 ppm, less than 40 ppm, or even less than 25 ppm.

Likewise, in by-product acids having silica and/or silicon oxychloride, the silicon concentration can be reduced by greater than about 90% in the product acid. In a further embodiment, the silicon concentration can be reduced by greater than about 95%. Silicon levels in the decontaminated acid product can be less than about 20 ppm. In further embodiments, the silicon concentration can be less than about 10 ppm, or even less than about 5 ppm. Such reduced concentrations of titanium and silicon are due, at least in part, to the time allotted to form the precipitate and the amount of settling time. As such, greater amounts of time can lead to further reduced contaminant concentrations. The above concentrations for titanium and silicon are provided with an anticipated separation step occurring less than about 30 hours after adding the phosphate ion source and the quaternary amine to the by-product acid.

With such contaminant removal, the decontaminated acid product can be commercial grade. In one embodiment, the decontaminated acid product recovery rate can be greater than about 45 wt % as based on the amount of decontaminated acid product compared to the amount of by-product acid. In a further embodiment, the recovery rate can be greater than about 55 wt %.

An added benefit to the decontamination of by-product acids can be color improvement. The color of the by-product acid can depend upon the number and concentration of the impurities in it. For example, an amber or greenish-yellow hue to the by-product acid normally indicates the presence of copper and iron, either as copper chloride, iron chloride, or as a ferro-titanium complex, which titanium complex yields a yellow-orange color in the presence of hydrogen peroxide. By-product acids of these hues, once processed according to the present methods, can have reduced color

EXAMPLES

The following examples illustrate the embodiments of the invention that are presently best known. However, it is to be understood that the following are only exemplary or illustrative of the application of the principles of the present invention. Numerous modifications and alternative compositions, methods, and systems may be devised by those skilled in the art without departing from the spirit and scope of the present invention. The appended claims are intended to cover such modifications and arrangements. Thus, while the present invention has been described above with particularity, the following examples provide further detail in connection with what are presently deemed to be the most practical and preferred embodiments of the invention. It should be further noted that the concentration and type of contaminants is not limited to the examples provided.

Example 1

Hydrochloric Acid by-Product with Phosphoric Acid and Polymeric Quaternary Amine To one gallon of by-product HCl, weighing 9.18 lbs-9.4 lbs and containing 2600 ppm of titanium as titanium dioxide and 287 ppm of silicon as silica, 63.55 grams of 85% phosphoric acid and 13.0 grams of GE PC 1195 (a polymeric quaternary amine) was added. The mixture was mixed for 1 hour under non-shearing conditions and allowed to settle. The total mixing and settling time was approximately 25 hours. After settling, the decontaminated acid product was removed by decanting the supernatant liquid and filtering the precipitate and acid retained in the precipitate through a 2 micron bag filter. The resulting separation produced 0.5555 gallons of decontaminated acid product in the decanted phase, containing less than 50 ppm of titanium as titanium dioxide and 10 ppm of silicon, calculated as silicon dioxide. The analytical results for determining the titanium and silicon concentrations were performed on a Leeman ICP.

Example 2

Control Example with Only Phosphoric Acid

To one gallon of by-product HCl weighing 9.18 lbs-9.4 lbs and containing 2600 ppm of titanium as titanium dioxide and 287 ppm of silicon as silica, 63.55 grams of 85% phosphoric acid was added. The mixture was mixed for 1 hour under non-shearing conditions and allowed to settle. The total mixing and settling time was approximately 25 hours. After settling, the decontaminated acid product was removed by decanting the supernatant liquid and filtering the precipitate and acid retained in the precipitate through a 2 micron bag filter. The resulting separation produced 0.5278 gallons of decontaminated acid product in the decanted phase, containing less than 50 ppm of titanium as titanium dioxide and 10 ppm of silicon, calculated as silicon dioxide. The analytical results for determining the titanium and silicon concentrations were performed on a Leeman ICP. As can be seen, the use of phosphoric acid and a polymeric quaternary amine as in Example 1, produces a higher yield of decontaminated acid in the same time.

Example 3

Hydrochloric Acid by-Product with Trisodium Phosphate and Polymeric Quaternary Amine To one gallon of by-product HCl weighing 9.18 lbs-9.4 lbs and containing 2600 ppm of titanium and 287 ppm of silica, 189.6 grams of trisodium phosphate decahydrate, containing an equivalent of 52.34 grams of phosphate ion, and 13.0 grams of GE PC 1195 (a polymeric quaternary amine) was added. The mixture was mixed for 1 hour under non-shearing conditions and allowed to settle. The total mixing and settling time was approximately 25 hours. After settling, the decontaminated acid product was removed by decanting the supernatant liquid acid and filtering the precipitate and acid retained in the precipitate through a 2 micron bag filter. The resulting separation produced 0.6389 gallons of decontaminated acid product in the decanted phase, containing less than 40 ppm of titanium as titanium dioxide and less than 9 ppm of silicon, calculated as silicon dioxide. The analytical results for determining the titanium and silicon concentrations were performed on a Leeman ICP.

Example 4

Control Example with Only Trisodium Phosphate

To one gallon of by-product HCl weighing 9.18 lbs-9.4 lbs and containing 2600 ppm of titanium and 287 ppm of silica, 189.6 grams of trisodium phosphate decahydrate, containing an equivalent of 52.34 grams of phosphate ion was added. The mixture was mixed for 1 hour under non-shearing conditions and allowed to settle. The total mixing and settling time was approximately 25 hours. After settling, the decontaminated acid product was removed by decanting the supernatant liquid acid and filtering the precipitate and acid retained in the precipitate through a 2 micron bag filter. The resulting separation produced 0.61 gallons of decontaminated acid product in the decanted phase, containing less than 40 ppm of titanium as titanium dioxide and less than 9 ppm of silicon, calculated as silicon dioxide. The analytical results for determining the titanium and silicon concentrations were performed on a Leeman ICP. As can be seen by comparison with Example 3, the use of only trisodium phosphate, results in a lower yield of decontaminated acid in the same amount of time.

Example 5

Hydrochloric Acid by-Product with Phosphoric Acid, Trisodium Phosphate, and Polymeric Quaternary Amine To one gallon of by-product HCl weighing 9.18 lbs-9.4 lbs and containing 2600 ppm of titanium and 287 ppm of silica, 31.18 grams of 85% phosphoric acid, 94.8 grams of trisodium phosphate decahydrate (containing an equivalent of 26.17 grams of phosphate ion), and 13.0 grams of GE PC 1195 (a polymeric quaternary amine) was added. The mixture was mixed for 1 hour under non-shearing conditions and allowed to settle. The total mixing and settling time was approximately 25 hours. After settling, the decontaminated acid product was removed by decanting the supernatant liquid acid and filtering the precipitate and the acid retained in the precipitate through a 2 micron bag filter. The resulting separation produced 0.708 gallons of decontaminated acid product in the decanted phase containing less than 25 ppm of titanium as titanium dioxide and 5 ppm of silicon calculated as silicon dioxide. The analytical results for determining the titanium and silicon concentrations were performed on a Leeman ICP. The acid pressed and filtered from the precipitate was of the same quality as the acid in the decant phase of the treated acid.

Example 6

Control Example with Only Trisodium Phosphate and Phosphoric Acid

To one gallon of by-product HCl weighing 9.18 lbs-9.4 lbs and containing 2600 ppm of titanium and 287 ppm of silica, 31.18 grams of 85% phosphoric acid and 94.8 grams of trisodium phosphate decahydrate (containing an equivalent of 26.17 grams of phosphate ion) was added. The mixture was mixed for 1 hour under non-shearing conditions and allowed to settle. The total mixing and settling time was approximately 25 hours. After settling, the decontaminated acid product was removed by decanting the supernatant liquid acid and filtering the precipitate and the acid retained in the precipitate through a 2 micron bag filter. The resulting separation produced 0.678 gallons of decontaminated acid product in the decanted phase containing less than 30 ppm of titanium as titanium dioxide and less than 7 ppm of silicon calculated as silicon dioxide. The analytical results for determining the titanium and silicon concentrations were performed on a Leeman ICP. As can be seen by comparison with Example 5, the use of only trisodium phosphate and phosphoric acid, results in a higher concentration of contaminants in the decontaminated acid for the same amount of time, and a lower yield.

While the invention has been described with reference to certain preferred embodiments, those skilled in the art will appreciate that various modifications, changes, omissions, and substitutions can be made without departing from the spirit of the invention. It is therefore intended that the invention be limited only by the scope of the appended claims.

What is claimed is:

1. A method for removing colloidal titanium dioxide and titanium oxychloride from by-product hydrochloric acid, comprising:
    adding phosphate ion source and quaternary amine to the by-product acid to cause the titanium dioxide and the colloidal titanium oxychloride to form a precipitate; and
    separating a decontaminated hydrochloric acid product from the precipitate.

2. A method as in claim 1, wherein the by-product acid is by-product hydrochloric acid generated in the production of titanium dioxide.

3. A method as in claim 1, wherein the phosphate ion source includes a phosphoric acid.

4. A method as in claim 3, wherein the phosphoric acid is added in an amount from about 12 g/gallon to about 125 g/gallon by-product acid.

5. A method as in claim 1, wherein the phosphate ion source includes a metallic phosphate salt.

6. A method as in claim 5, wherein the metallic phosphate salt includes calcium phosphate or sodium phosphate.

7. A method as in claim 5, wherein the metallic phosphate salt is added in an amount from about 45 g/gallon to about 400 g/gallon by-product acid.

8. A method as in claim 1, wherein the phosphate ion source includes a phosphonate.

9. A method as in claim 1, wherein the phosphate ion source includes at least two different phosphate ion sources.

10. A method as in claim 9, wherein the phosphate ion source includes a phosphoric acid and a metallic phosphate salt.

11. A method as in claim 1, wherein the quaternary amine is a polymeric quaternary amine.

12. A method as in claim 1, wherein the quaternary amine is a polyamine.

13. A method as in claim 1, wherein the quaternary amine is added in an amount from about 5.0 g/gallon to about 50.0 g/gallon by-product acid.

14. A method as in claim 1, further including precipitating colloidal silica from the by-product acid upon the addition of phosphate ion source and quaternary amine to the by-product acid.

15. A method as in claim 14, wherein the silica concentration in the by-product acid is reduced by greater than about 90%.

16. A method as in claim 1, wherein the titanium dioxide concentration in the by-product acid is reduced by greater than 95%.

17. A method as in claim 1, wherein decontaminated acid product recovery rate is greater than about 45 wt %.

18. A method as in claim 1, wherein decontaminated acid product recovery rate is greater than about 55 wt %.

19. A method as in claim 1, wherein the decontaminated acid product is commercial grade.

20. A method as in claim 1, wherein the step of separating the decontaminated acid product from the precipitate includes filtering.

21. A method as in claim 1, wherein the step of separating the decontaminated acid product from the precipitate includes settling.

22. A method as in claim 1, wherein the method is performed at or below room temperature.

23. A method as in claim 1, wherein the step of separating the decontaminated acid product from precipitate occurs less than about 30 hours after adding the phosphate ion source and the quaternary amine to the by-product acid.

24. A method as in claim 1, further comprising using the decontaminated acid product in a commercial process.

25. A method as in claim 24, wherein the commercial process is steel pickling.

26. A method as in claim 24, wherein the commercial process is the manufacture of aluminum chloride water treatment chemicals.

27. A method for removing colloidal titanium dioxide and titanium oxychloride from by-product acid generated in the production of titanium dioxide, comprising:
- adding phosphoric acid, a metallic phosphate salt, and a quaternary polyamine to the by-product acid to cause the colloidal titanium dioxide and the titanium oxychloride to form a precipitate; and
- within about 30 hours, separating a decontaminated acid product from the precipitate.

* * * * *